United States Patent [19]

Barker

[11] 3,712,038

[45] Jan. 23, 1973

[54] ASPARAGUS HARVESTER

[76] Inventor: George R. Barker, P. O. Box 518, Banning, Calif. 92220

[22] Filed: Feb. 14, 1972

[21] Appl. No.: 225,999

[52] U.S. Cl. .............................56/327 A, 198/33 AD
[51] Int. Cl. ...............................................A01d 45/00
[58] Field of Search .....56/327 A, 327 R; 171/39, 40, 171/42, 55, 58, 59; 198/33 AD

[56] References Cited

UNITED STATES PATENTS

| 2,791,878 | 5/1957 | Kepner | 56/327 A |
| 3,548,950 | 12/1970 | Phelan | 171/39 |

Primary Examiner—Louis G. Mancene
Assistant Examiner—J. A. Oliff
Attorney—Charles G. Lyon et al.

[57] ABSTRACT

An asparagus harvester which engages the growing asparagus in the field, cuts the asparagus spears at or below the ground level, releases the asparagus spear onto a conveyor belt which conveys the asparagus spear on an inclined belt moving upwardly and rearward from the asparagus harvesting device, in a direction opposite to the travel of the harvesting device. After reception of the asparagus spears by the inclined belt, they are deposited in a hopper or box carried on the rear of the machine. A roller is provided rearwardly from the pick-up mechanism and saw, and through a parallelogram of the frame members maintains a constant depth of the saw at or below the ground level.

5 Claims, 4 Drawing Figures

PATENTED JAN 23 1973

ASPARAGUS HARVESTER

BACKGROUND OF THE INVENTION

The present apparatus is an improvement in asparagus harvesters over the device disclosed in U.S. Pat. No. 2,791,878 for an "ASPARAGUS HARVESTER" issued to Robert A. Kepner, issued on May 14, 1957 and an improvement over the device disclosed in U.S. Pat. No. 3,548,577 issued to George R. Barker on Dec. 22, 1970. The present invention provides a novel means for the transfer from the asparagus cutting and harvesting device, and allows for a rearward transfer of the asparagus spears to a hopper in the rear while eliminating the dirt, and other matter forward from the transfer means which will be deposited on the ground.

Asparagus grows in a number of various patterns and are planted in a number of fashions. In some cases the asparagus beds are grown in long rows, in some circumstances these rows are in raised beds and other circumstances they may be grown in flat beds. The asparagus spears themselves do not grow in straight rows but are spread out in a widely scattered pattern. Secondly, the height attained by the spears between cutting is subject to a wide variation. Thirdly, the thickness or diameter of the spears likewise is random. Fourthly, the spears are easily damaged and broken, particularly the tender tip, which precludes rough handling during the harvesting. Accordingly, it is the principal object of the present invention to provide a mechanical harvester for harvesting green asparagus by compensating for the obstacles which have heretofore made mechanical harvesting impractical.

While the asparagus spears are grown in rows they are scattered throughout these rows. The scattered location of the spears is accommodated by the dividers which urge the spears within the channels without crushing or breakage. The random height of the spears is accommodated by cutting all the spears at the same level, regardless of their height, thus requiring less frequent cutting than by hand. The random thickness of the spears is accommodated by employing very flexible gripping means to convey spears from the location of cutting to the conveyor. The easily damaged nature of the asparagus is accommodated by moving the spears in this resiliently mounted means which prevents the rough handling which might otherwise impair the commercial value of the product.

The device of the present invention is a harvester, pulled by a tractor through any suitable hitch arrangement which advances the harvester along the asparagus bed behind a tractor, the spears are sawed off by a rapidly moving transverse band at a level set at or slightly below the surface of the bed. Prior to being severed, the spears are gently bent to one side or the other without damage so that they pass into a plurality of channels defined by dividers at the front of the harvester. At the instant before severing the spears are individually grasped by resilient annular rings, there being one set of rings for each channel, and these rings grasp the severed spears and move them backward to a rearward moving conveyor which deposits the spears in a hopper at the end of the harvester.

At the same time the harvester materially reduces the labor required to harvest a bed of asparagus. The hand cutting operation is eliminated, thereby reducing the cost of harvesting and eliminating the hazard that a labor supply might not be available throughout the relatively long harvest period.

DESCRIPTION OF THE INVENTION

Mounted above the cutting bed at the forward part of the harvester are a series of sheet metal dividers 10 which are suspended from a transverse frame member 12 and a transverse rod running through the end of vertical frame member 26. These sheet metal dividers center the growing asparagus spears and divide them into groups as the harvester moves through the field substantially in the same fashion as that described in U.S. Pat. No. 2,791,878 issued to Robert A. Kepner.

Figure 1:
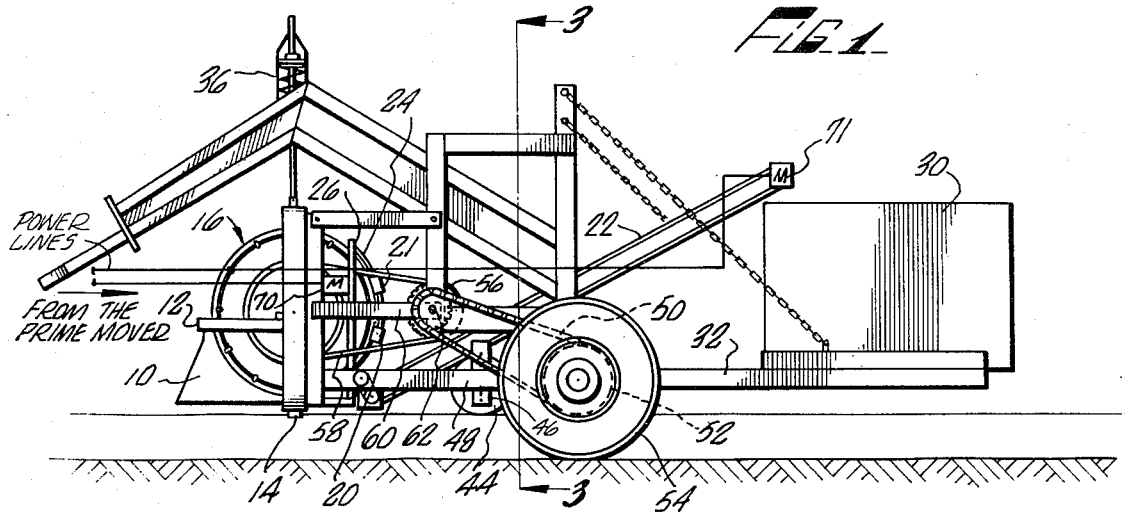
FIG. 1 is a side view of the asparagus harvester.
Figure 2:
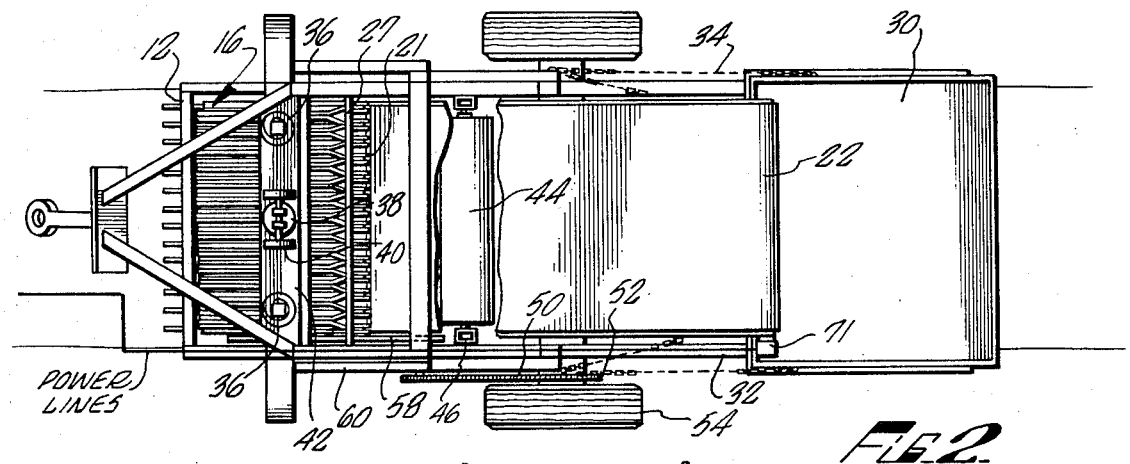
FIG. 2 is a top view of the asparagus harvester of the present invention.
Figure 3:
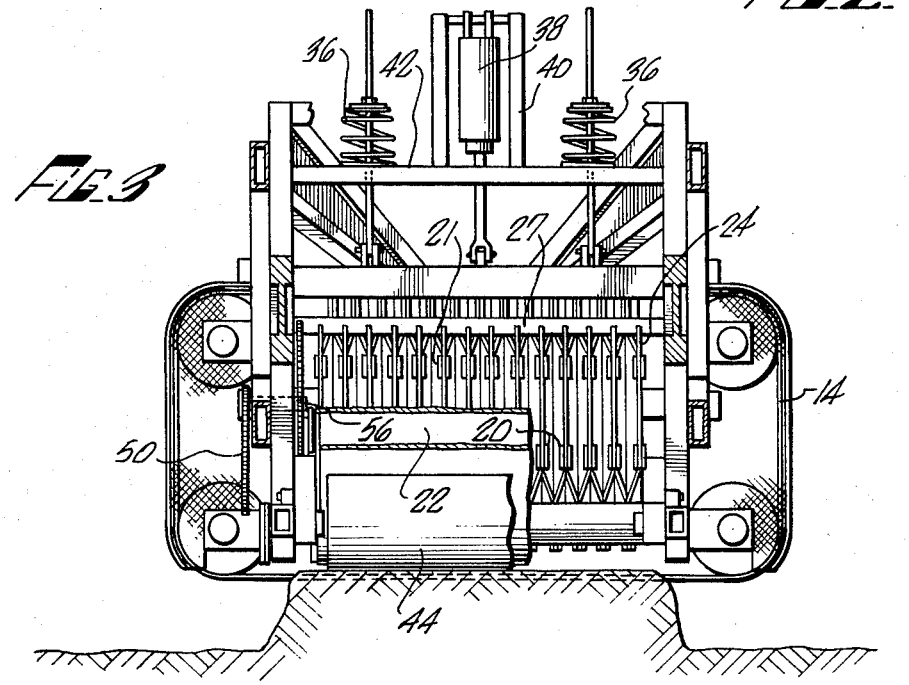
FIG. 3 is a cross-sectional view of the asparagus harvester taken through lines 3—3 of FIG. 1.
Figure 4:
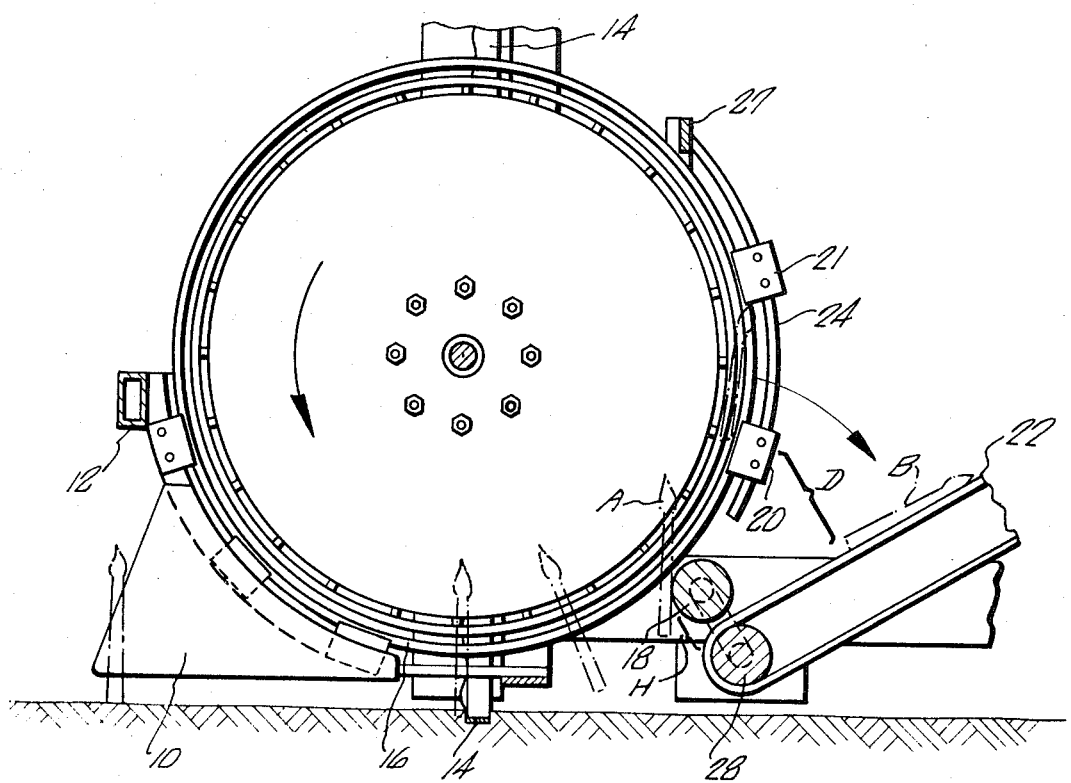
FIG. 4 is a schematic view of the preferred embodiment of the asparagus harvester illustrating the means in which the asparagus is harvested and released upon the conveyor belt.

In order to illustrate the basic nature of the invention reference is made first to FIG. 4. The asparagus spears, shown generally are severed from the stalk at or below the ground level by a transversely moving cutting device 14 which moves in a substantially rectangular path transverse to the direction of the harvester. This cutting device or saw may be of any suitable material having sufficient strength to cut asparagus stalks at or below the ground level without substantial breakage upon encountering small rocks or other material encountered by the cutting device.

The asparagus spears are gripped by the pick-up mechanism 16 prior to being sawed. The pick-up mechanism 16 transports the severed spears to a location toward the rear of the machine where the butt portion of the spear contacts a rolling bar 18. This bar causes the stalks to move to a substantially vertical position as shown at A.

Dividers 20 and 21 open the pick up mechanism and as the machine moves forward the asparagus stalk is deposited upon the conveyor belt as illustrated at B.

The dividers 20 and 21 are suspended on a semicircular bar 24 which is attached at the top by a frame 27 running horizontally with respect to the pick-up mechanism by vertically extending frame members 26. The purpose for this attachment being at the top of bars 24 is to allow for a free flow of asparagus spears to belt 22. The dividers 20 and 21 are set at a height D to allow the asparagus spear to fall on the belt above belt roller 28.

A gap H is provided between rollers 18 and 28 to allow foreign matter to fall off the belt 22. To prevent the asparagus spears from being caught in the gap, roller 28 moves at a circumferential speed greater than roller 18 to move the asparagus up the belt. At present, the present invention utilizes a ratio of 3 to 3.5 between roller 18 and roller 28 but other ratios may prove suitable as long as roller 28's circumferential speed is greater than that of roller 18.

Referring now to FIGS. 1, 2, 3 and 4 illustrating the overall device of the invention after the harvested asparagus has been deposited on the belt, it is then deposited in a container 30 suspended on the rearward portion of frame 32 and supported by an adequate supporting mechanism such as chain 34.

In order to maintain the desired cutting depth of saw 14, the weight of pick-up mechanism and saw are partially suspended by springs 36 and raised and lowered into the proper ground position by a hydraulic cylinder 38 suspended by frames 40 on a transverse frame member 42.

A roller 44 is partially suspended on a frame member 46 which is connected to a horizontal frame member 48, this frame also contains the pivot point of the pick-up reel and saw. As roller 44 moves along the ground it moves either upwardly or downwardly to maintain the depth adjustment of the saw in relation of the ground as the ground level varies.

The pick-up reel is operated at the ground speed of the harvester by a chain 50 connected to the drive sprockets 52 driven by tire 54. A gear 56 connects chain 50 to chain 58 which drives the pick-up reel.

A second horizontal member 60 provides a support for gear 56 and as the roller 44 and members 46 and 48 move the horizontal member 60 moves and maintains the tension on chains 50 and 58 because the pivot point of gear 56 is the same as the pivot point 62 of horizontal member 60.

The cutting blade 14 and conveyor belt 22 are driven hydraulically by hydraulic motors 70 and 71, respectively, from the power take-off from the prime mover.

Various changes and modifications may be made in carrying out the present invention without departing from the scope and spirit thereof. Insofar as these changes and modifications are within the purview of the annexed claims they are to be considered as part of the invention.

I claim:

1. In an asparagus harvester, the combination of:
   a. a mobile frame having ground wheels, a subframe mounted for free floating movement on the mobile frame toward and away from the ground, power driven rotary pickup means mounted on the subframe, power driven transverse cutting means mounted on the subframe, a transverse rotary member mounted on the subframe rearward of the cutting means and pickup means for pivoting, with respect to the rotary pickup means, apparagus stalks which have been gripped by said pickup means and severed by the cutting means, release means for said pick-up means for discharging pivoted asparagus stalks from said pick-up means, a belt conveyor rearwardly of the pickup means and the cutting means and having a forward end positioned adjacent said rotary member to receive asparagus discharged from said pick-up means, and a roller on the subframe for free floating movement over the ground rearward of said cutting means and pick-up means for regulating the position of both said cutting means and said pickup means with respect to said mobile frame.

2. The combination of claim 1 comprising:
   a. transverse frame member on said sub-frame member supporting a series of sheet metal dividers for aligning the growing asparagus spears into a series of rows,
   b. said rotary pickup means being a pick-up mechanism mounted on said sub-frame member which grasps the asparagus spears immediately prior to cutting;
   c. said cutting means being a transversely moving cutting means which cuts the asparagus spears;
   d. said rotary member being a member rearward of said pick-up means and said cutting means which encounter the butt portion of said asparagus spear after cutting which aligns said stalk to a substantially vertical position;
   e. said release means being a series of dividers rearward of said pick-up mechanism which open the pick-up mechanism and causes the asparagus spears to be released from said pick-up mechanism on to said belt conveyor.

3. The asparagus harvester of claim 2, wherein:
   a. said member rearward of said pick-up means which encounter the butt portion of said asparagus spear rotates in a direction opposite to the direction of movement of the upper run of the rearwardly moving belt conveyor and is adjusted at a height sufficient to allow the deposit of foreign matter from the belt to the ground.

4. The asparagus harvester of claim 1 wherein said subframe comprises:
   a. a parallelogram of frame members, said roller attached to the rear of said parallelogram and resting on the ground;
   b. a pivotal attachment between said roller, said cutting means and said pick-up means which maintains a constant depth of the transverse cutting means as the ground level varies.

5. An asparagus harvester mounted on a mobile frame comprising:
   a. longitudinal and traverse frame members;
   b. one of said traverse frame members being forwardly mounted and supporting a series of sheet metal dividers to align the asparagus spears into a series of rows;
   c. a free floating pick-up mechanism capable of upward and downwardly movement as the ground level varies which grasps the asparagus spears immediately prior to cutting;
   d. a transversely moving cutting means capable of cutting the asparagus stalks below the ground level;
   e. a transverse rolling means rearward of said pick-up means and said transverse cutting means which engages the butt portion of said asparagus stalk after it has been cut and aligns said stalk to a substantially vertical position;
   f. a series of dividers rearward of said pick-up mechanism which opens up the pick-up mechanism and releases said asparagus stalk onto a belt moving rearwardly to the direction of travel of the asparagus harvester.

* * * * *